United States Patent [19]
Pagano

[11] Patent Number: 6,104,883
[45] Date of Patent: Aug. 15, 2000

[54] MEMORY MODULE READER

[75] Inventor: Daniel M. Pagano, Honeoye Falls, N.Y.

[73] Assignee: Eastman Kodak Company, Rochester, N.Y.

[21] Appl. No.: 09/285,159

[22] Filed: Apr. 1, 1999

[51] Int. Cl.[7] .................................................. G03B 7/24
[52] U.S. Cl. .......................................... 396/208; 396/211
[58] Field of Search ................................. 396/207, 208, 396/211

[56] References Cited

U.S. PATENT DOCUMENTS

| | | | |
|---|---|---|---|
| 4,431,283 | 2/1984 | Hoda et al. | 396/208 |
| 4,588,273 | 5/1986 | Nagata | 396/208 |
| 4,693,574 | 9/1987 | Ohnuki et al. | 396/207 |
| 5,032,855 | 7/1991 | Taniguchi et al. | |
| 5,349,401 | 9/1994 | Bryant | |
| 5,394,206 | 2/1995 | Cocca | |
| 5,526,084 | 6/1996 | Kataoka et al. | |
| 5,608,485 | 3/1997 | Kataoka et al. | |
| 5,710,617 | 1/1998 | Inuiya | |

*Primary Examiner*—Russell Adams
*Attorney, Agent, or Firm*—Robert Luke Walker

[57] ABSTRACT

A memory module reader has a body having a module socket. The module socket defines a cylindrical contact site and a site axis. A terminal block is joined to the body. The terminal block includes a plurality of leads and a cam unit having at least one cam surface. The cam unit is aligned with and biased toward the contact site. An assembly includes the memory module reader and a memory module removably retained in the module socket. The memory module has a flexible support and a memory element fixed to the support.

20 Claims, 9 Drawing Sheets

MEMORY MODULE READER

MEMORY MODULE READER

FIELD OF THE INVENTION

The invention relates to photography and more particularly relates to a reader for a removable memory module used in a film cassette.

BACKGROUND OF THE INVENTION

In order to better record ancillary information about captured images, some film cassettes have an internal electronic memory, which is written to by a microprocessor in a camera. Good electrical contact must be maintained in the camera between a series of fixed contacts on the memory and a series of leads in the camera. To reduce overall camera and film cassette size, the parts involved are quite small. Misalignment easily occurs unless all parts are precisely made.

A very large number of cameras use Type 135 ("35 mm") film. Type 135 film cassettes are defined by the standard: ANSI PH1.14M-1983 promulgated by the American National Standards Institute, Inc. of New York, N.Y. This standard provides for a substantially cylindrical cassette shell having an exposed spool portion protruding from each end of the shell and a shell slot at each end around the exposed spool portion. The slot is open-topped and roughly discoidal in shape having an empty discoidal center to accommodate the spool portion.

Electronic memory could be mounted to a Type 135 film cassette, however, this is problematic. Film cassettes are not ordinarily returned when Type 135 film is processed. Information recorded in memory, but not used in processing, would be lost if a cassette having electronic memory was discarded. Returning the memory in an empty cassette shell would be possible, but cumbersome. Replacement memory could be provided in some form, but this would be costly or cumbersome or both.

It would thus be desirable to provide means for reading a removable film cassette electronic memory while the memory is separated from the cassette.

SUMMARY OF THE INVENTION

The invention is defined by the claims. The invention, in its broader aspects, provides a memory module reader has a body having a module socket. The module socket defines a cylindrical contact site and a site axis. A terminal block is joined to the body. The terminal block includes a plurality of leads and a cam unit having at least one cam surface. The cam unit is aligned with and biased toward the contact site. An assembly includes the memory module reader and a memory module removably retained in the module socket. The memory module has a flexible support and a memory element fixed to the support.

It is an advantageous effect of at least some of the embodiments of the invention that an apparatus is provided for reading a removable film cassette electronic memory while the memory is separated from the cassette.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
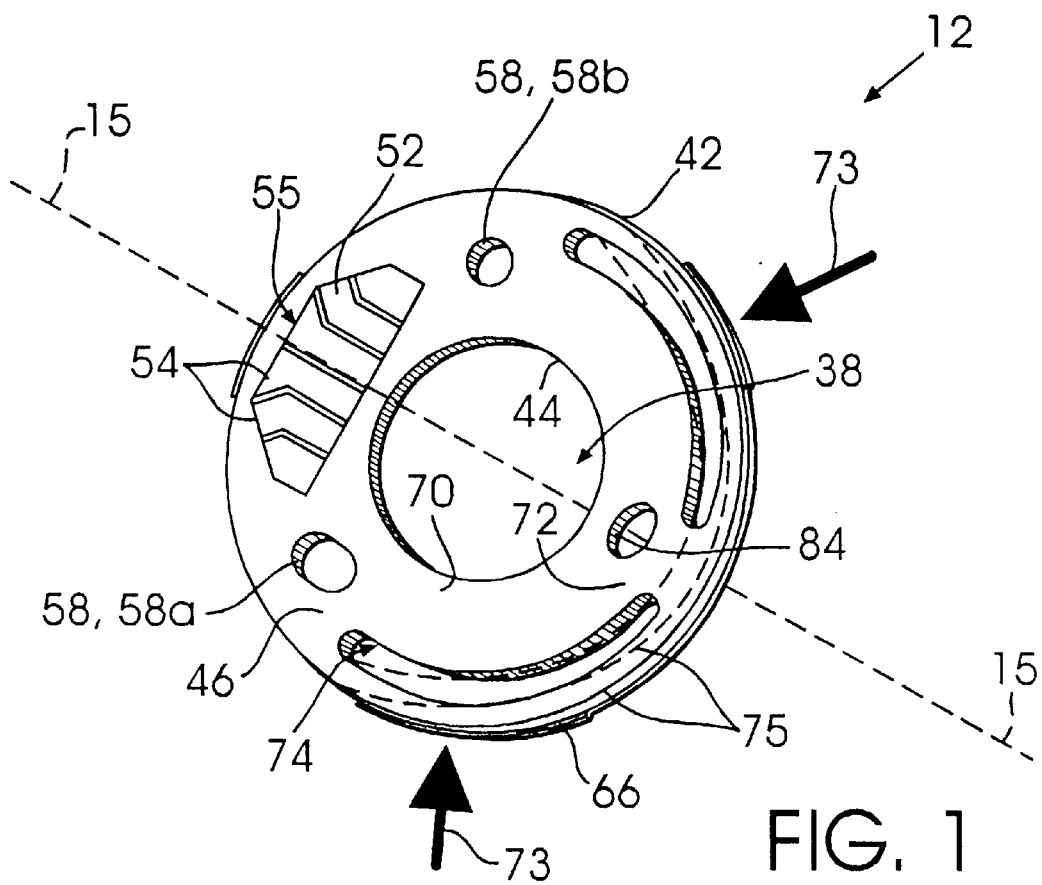
FIG. 1 is top perspective view of an embodiment of the memory module. The struts are shown unflexed with solid lines and flexed with dashed lines.
Figure 2:
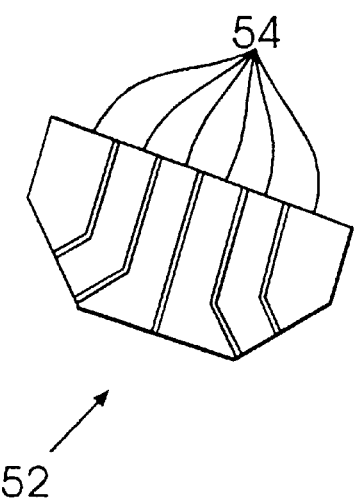
FIG. 2 is a top perspective view of the memory unit of the memory module of FIG. 1.
Figure 3:
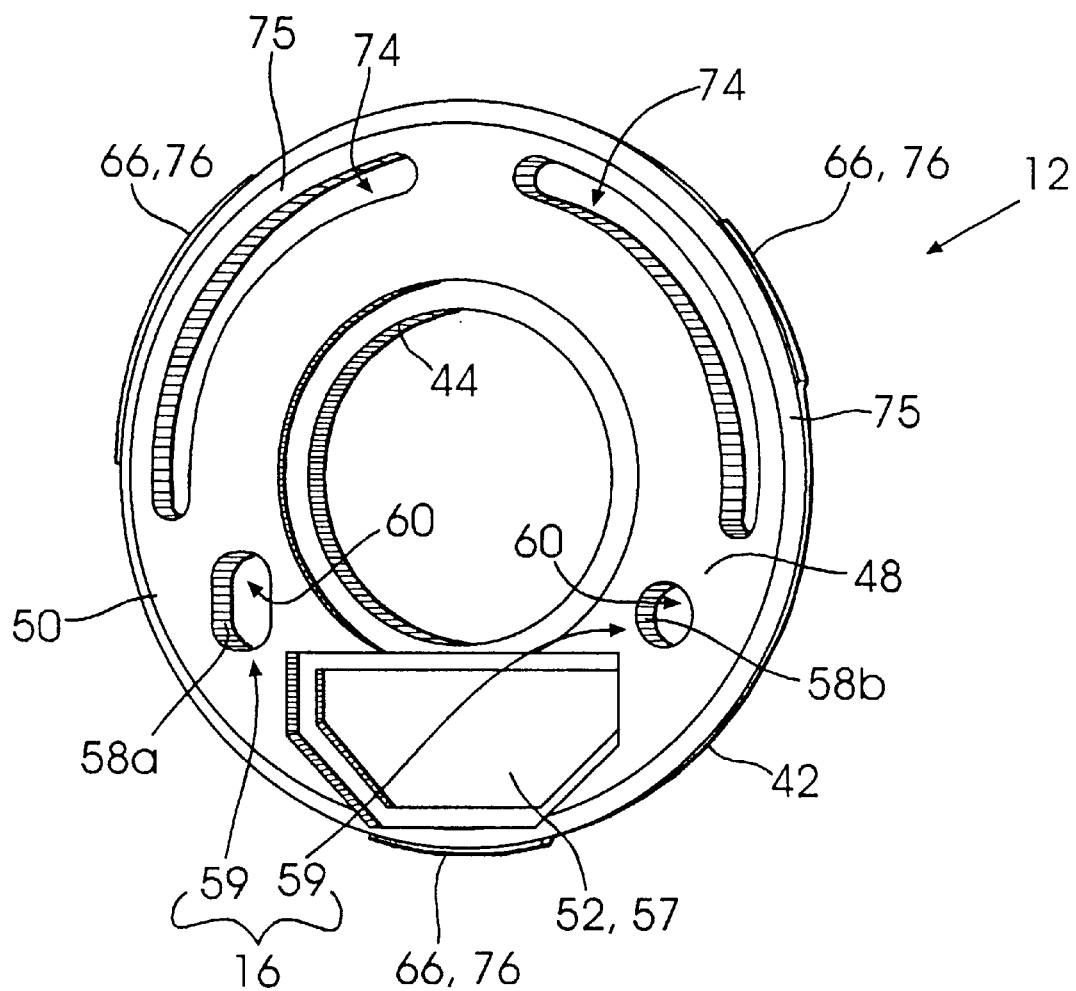
FIG. 3 is a bottom perspective view of the memory module of FIG. 1.

Referring initially to FIGS. 1–7 and 11, a film cassette 10 has a memory module 12 that floats within a slot 11 formed by the shell 14 of the cassette 10. The memory module 12 has a locator 16 and defines a module axis 15.

A photographic apparatus 18 receives the film cassette 10 in a cassette station 20. The cassette station 20 includes a terminal block 22 that has a cam unit 24. When the film cassette 10 is loaded in the cassette station 20, the locator 16 and cam unit 24 are in engagement, and the memory module 12 is held in place relative to the photographic apparatus 18 and the cassette shell 14.

Figure 4:
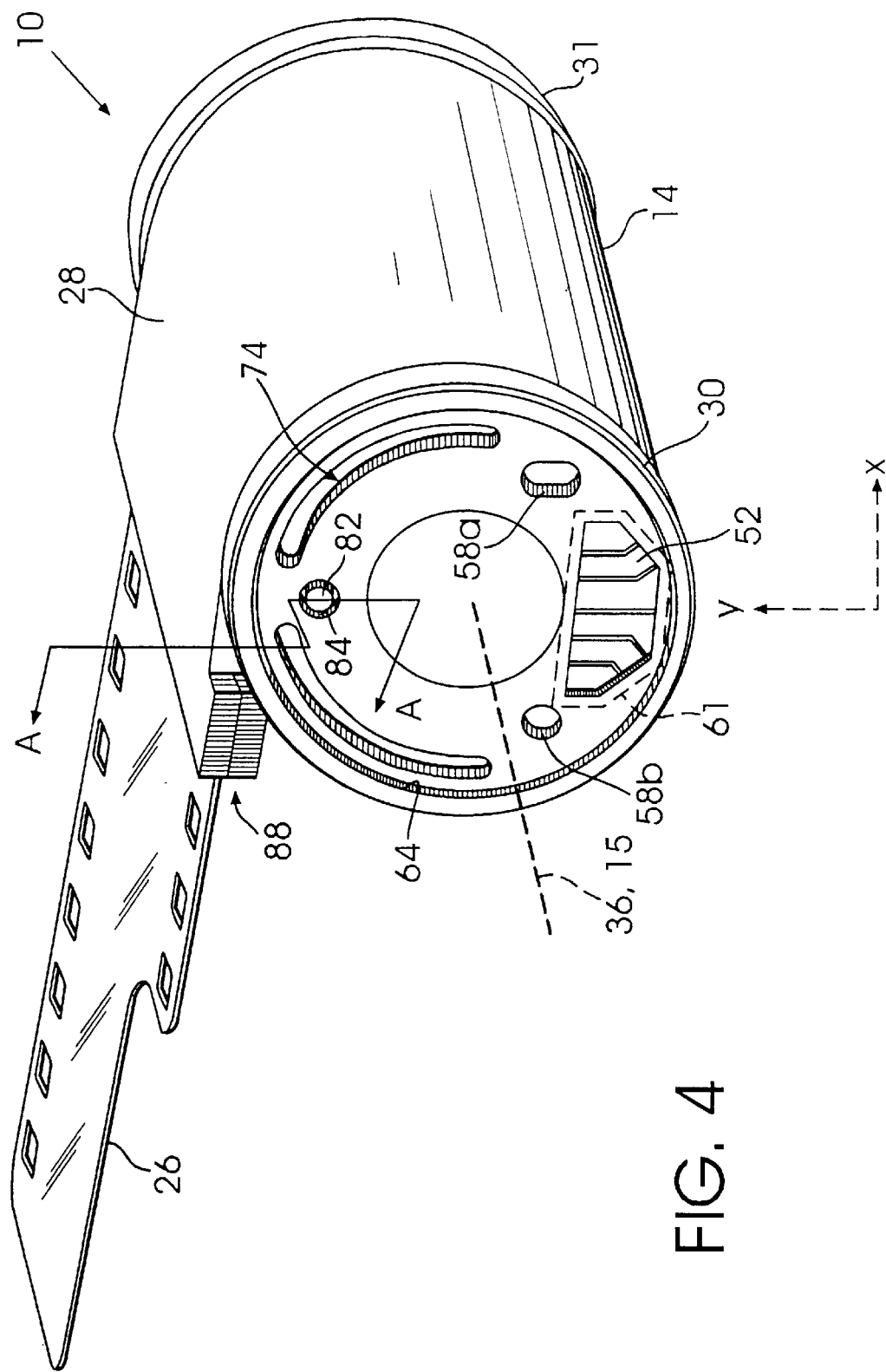
FIG. 4 is a perspective of an embodiment of the film cassette, including the memory module of FIG. 1. The location of the access site is indicated diagrammatically by a dashed line.
Figure 5:
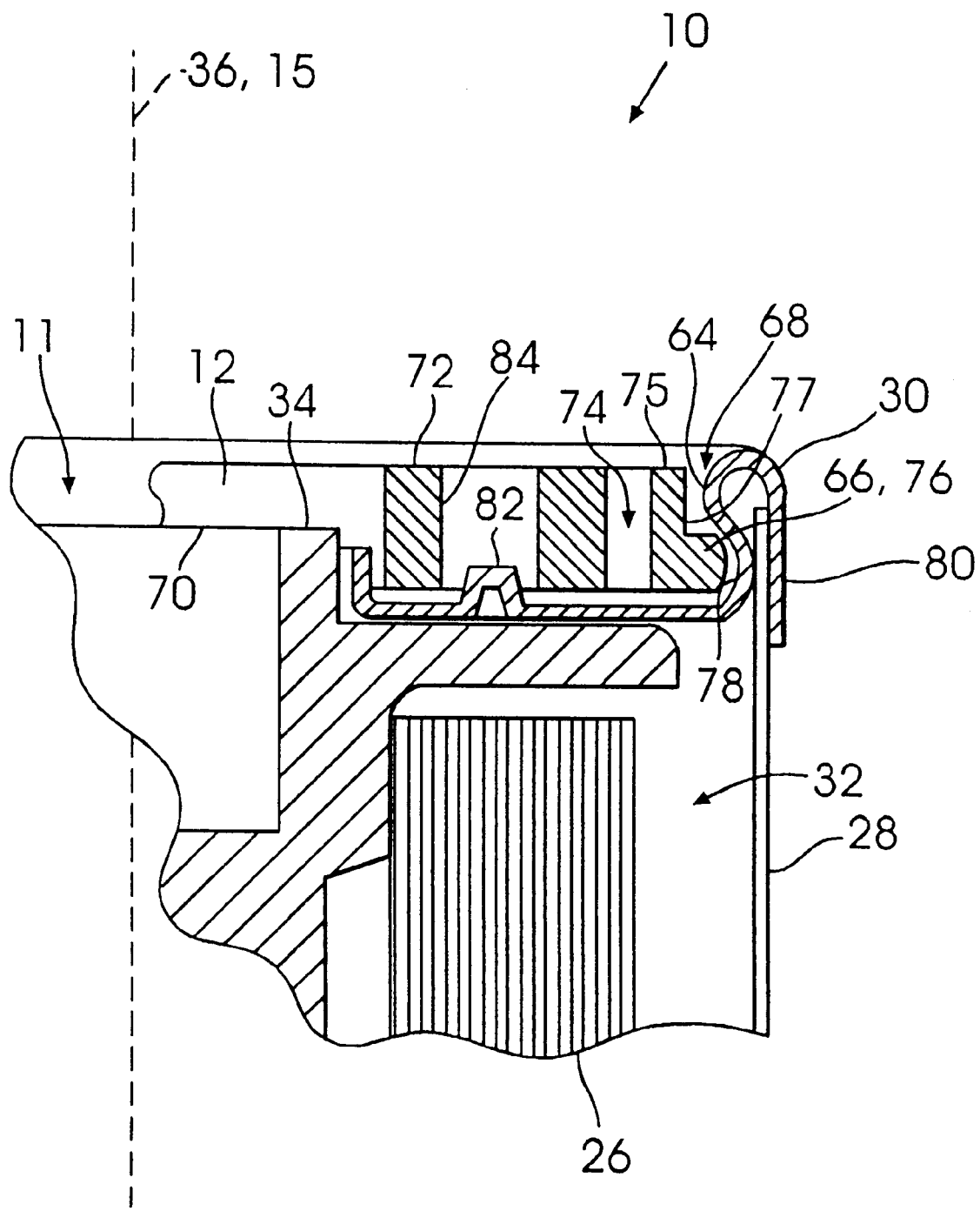
FIG. 5 is a partial cross-sectional view of the film cassette of FIG. 4 taken substantially along line A—A of FIG. 4.

Referring now primarily to FIGS. 4–5, a filmstrip 26 is coiled within the shell 14. The film cassette 10 is illustrated as being a slightly modified Type 135 film cassette. The film cassette 10 is not limited to any particular configuration. For example, the film cassette 110 can be a two chambered cassette, similar to a Type 110 film cassette.

The shell 14 has a side wall 28, to which end caps 30,31 are mounted at either end. The module slot 11 is defined by end cap 30. It is not critical which end of the cassette 10 includes slotted end cap 30, but in practice the selected end would be standardized. Alternatively, both ends of the cassette 10 can include a slotted end cap 30. The film cassette 10 light-tightly holds the filmstrip 26 in a film space 32, coiled about a cassette spool 34. The cassette spool 34 and the coiled filmstrip 26 each define a cassette axis 36 about which the spool 34 is free to rotate.

The module slot 11 is separate from and external to the film space 32 and not light-tight. The shell 14 is preferably open over the end cap 30, but can have an end wall (not illustrated) over the slot 11, if the end wall does not hinder access to the module 12 for memory usage and for removal.

Referring now primarily to FIGS. 1–3 and 11, the memory module 12 has roughly the shape of a disk or lozenge with a hollow central passage 38 centered on module axis 15. The memory module 12 has outer and inner edges 42,44 and opposed upper and lower surfaces 46,48. (Direction terms such as "upper" and "lower" are used herein solely as relative terms and do not connote absolute orientations.) For convenience, the memory module 12 is generally described herein in terms of a disk-shape like that of a flat washer. It will be understood that like considerations apply to modules of other shapes, such as the module illustrated in FIG. 11.

The memory module 12 has a support 50 and a memory unit 52 mounted on the support 50. The memory unit 52 has one or more electronic components (not separately illustrated), which are directly mounted to one or both surfaces of the support 50 or are mounted to a miniature circuit board (not separately illustrated, which is itself mounted to the support 50. The memory unit 52 includes an array of electrical contacts 54 that face outward from the upper surface 46. In the embodiment shown in the figures, the memory unit 52 is an integrated circuit element, which is mounted to a window 55 in the support 50 such that the electrical contacts 54 are exposed on the upper surface 46 of the module 12. At the upper surface 46, the contacts 54 are generally coplanar with the support 50. The integrated circuit element is embedded in plastic potting or the like which provides a smooth pad 57 to ensure that the lower surface 48 does not bind against the end cap 30.

The locator 16 of the memory module 12 includes one or more locating surfaces 58. In the memory modules 12 shown in the figures, the locator 16 has a pair of opposed subunits 59. Each subunit 59 has an opening 60. The margins of the openings 60 form the locating surfaces 58. One of the locating surfaces 58a is oval in shape; the other locating surface 58b is circular.

Referring now primarily to FIGS. 1–5 and 11, the memory module 12 is loosely-retained in the module slot 11 by the end cap 30. The memory module 12 is repeatedly removable and replaceable in a shell 14 or series of shells without damage to the memory module 12 and, preferably, without damage to the shell or shells 14.

The memory module 12 is held within the module slot 11 by interference features of the shell 14 and memory module 12. The interference features allow relatively free motion of the module 12 in a plane (indicated by dashed arrows x-y in FIG. 4) perpendicular to the cassette axis 36. The memory module 12 can pivot and translate in a plane perpendicular to the cassette axis 36 within the bounds of the slot 11. Axial movement of the module 12 and rotational movement out of that plane is closely limited. (Terms used herein that refer to an axis, such as "axial" and "radial" do not recite a specific axis where the context indicates the relevant axis or where the indicated directions coincide. For example, the module axis 15 and cassette axis 36 are parallel or coincident when the module 12 is loaded in the module slot 11.)

In preferred embodiments, the end cap 30 of the shell 14 has a collar 64 that protrudes radially inward from the side wall 28 and the memory module 12 has a retainer 66 that protrudes radially outward at the outer edge 42 of the module 12. The collar 64 is positioned so as to limit the axial dimension of the module slot 11 to no more clearance than is necessary to allow the memory module 12 to move within the slot 11. The collar 64 and retainer 66 can each be continuous or segmented, with adjoining segments separated by 180 degrees or less. The collar 64 borders and defines an entry 68 for the admission of the memory module 12 into the slot 11. The memory module 12 and shell 14 can both be rigid. In this case, the interference fit can be provided, by an axial overlap of parts achieved by insertion and rotation of the memory module 12 relative to the shell 14. The memory module 12 and shell 14 can, alternatively provide a snap fit, in which the module 12, shell 14, or both flex to allow installation and removal of the module 12. It is currently preferred that the shell 14 is rigid and the support 50 of the module 12 flexible, for reasons of ease of manufacture and use and to better protect the enclosed filmstrip 26. When flexed, one or more parts of the support 50 deflect toward the module axis 15, reducing a radial cross-section of the module 12. The entry 68 of the module slot 11 has a radial cross-section that is greater than the radial cross-section of the flexed memory module 12 and is less than the radial cross-section of the memory module 12 when the memory module 12 is not flexed.

In the embodiment shown in the figures, the support 50 is made of a slightly flexible sheet material and has a central hub portion 70 and a slightly thicker outer portion 72. The outer portion 72 has a pair of cut-outs 74 which locally increase flexibility. The cut-outs 74 reduce part of the outer portion 72 to a pair of narrow struts 75 that border and are radially exterior to the cut-outs 74. The module 12 is flexed by applying a radial force or forces (indicated by arrows 73) against the module 12 at the struts 75. When the module 12 is flexed, the narrow struts 75 bend (as shown in FIG. 1) reducing the radial cross-section of the module 12. The cut-outs 74 allow the thickness of the remainder of the support 50 to be relatively thicker so as to better hold the memory unit 52, without an overall loss of needed flexibility.

The retainer 66 of the support 50 has three equally separated segments 76 (best shown in FIG. 3) that protrude from the outer edge 42 of the support 50. Referring particularly to FIG. 5, each segment 76 has an axial dimension that is less than the axial dimension of an upper section 77 of the outer edge 42. The collar 64 is continuous around the end cap 30 and has the form of an inwardly directed brim. Below the collar 64, the end cap 30 extends radially outward and forms a circular trough 78 that abuts the inside of the wall 28 of the shell 14. The end cap 30 then turns back inward, that is, from an axial direction to a radial direction, toward the spool 34 forming a radial wall 80. The end cap 30 recurves beyond the collar 64 and extends axially along the outside of the side wall 28. When the module 12 is in the slot 11, the upper section 77 is axially aligned with and radially inward from the collar 64 and the retainer 66 is radially aligned with and axially inward from the collar 64. The area of contact between the collar 64 and the upper section and between the trough and the retainer 66, can be varied. It is preferred that the collar 64 and trough have closely the same axial dimensions as the upper section and retainer 66, respectively. It is also preferred that the collar 64 and trough have radial dimensions that are closely similar to the radial dimensions of the upper section and retainer 66, respectively.

The rotational movement or rotational and translational movement of the memory module 12 in the radial plane, within the slot, is preferably limited by bumpers 82,84 formed in the support 50 of the memory module 12 and the end cap 30 of the shell 14, respectively. The bumpers 82,84 are complementary in shape. The bumpers 82,84 are each disposed in rotationally non-symmetrical relation to the cassette axis 36, that is, each bumper 82 or 84 is not rotationally symmetrical about the respective cassette axis 36 or module axis 15. The bumpers 82,84 loosely couple the module 12 against rotation within the module slot 11; that is, the bumpers 82,84 allow the memory module 12 to rotate freely over a limited range within the module slot 11, but interfere with each other so as to block rotation beyond that limited range. In the embodiment shown in the figures, one bumper 82 is a peak or post that protrudes axially outward from the outer portion 72 of the end cap 30 into the module slot 11 and the other bumper 84 is the inner edge of a circular hole in the support 50. The peak and hole can alternatively be provided on the memory module 12 and end cap 30, respectively. The bumpers 82,84 can also have other shapes. For example, the memory module 12 can be shaped like a disk truncated at a chord that acts as a bumper 84. The bumper 82 of the end cap 30 is a section of wall 28 corresponding to the chord. The bumpers shown in FIGS. 1–10 are preferred for use with a shaped metal end cap, since bumper 82 can be easily shaped at the same time as the rest of the end cap 30. More complexly shaped bumpers, requiring additional shaping steps are not preferred.

The bumpers 82,84 are positioned to limit the range of motion of the memory module 12 in the radial plane such that the locating surfaces 58 of the locator 16 remain, at all times, in at least partial axial alignment with a predetermined access site 61 defined by the shell 14 of the cassette. Looking at FIG. 4, the shell 14 has a film exit 88 that has a predetermined, fixed spatial relationship to the access site (indicated diagrammatically in FIG. 4 by a dashed line). This ensures that the cam unit 24 (discussed in detail below) encounters the locating surfaces 58 when the cam unit 24 meets the locator 16.

Figure 6:
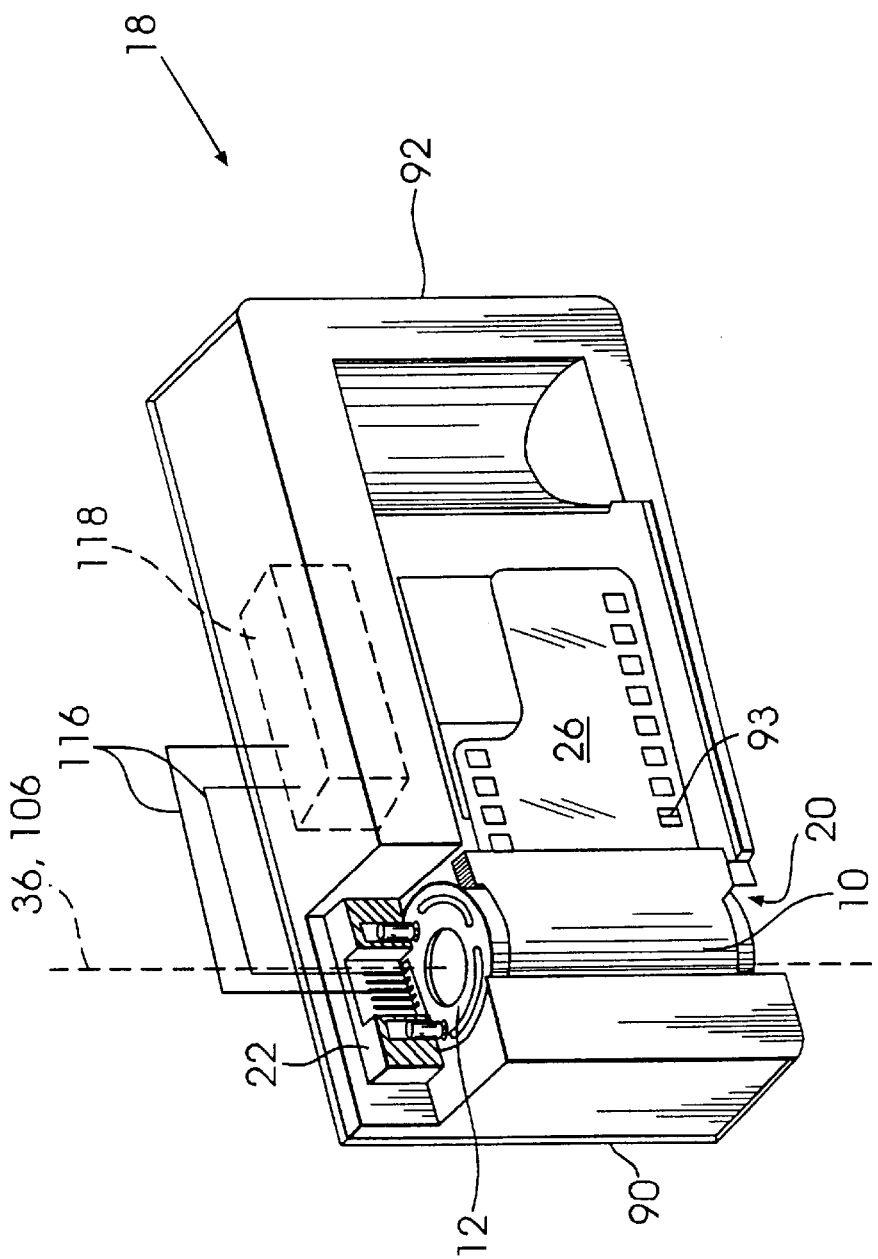
FIG. 6 is a perspective view of a photographic apparatus including the film cassette of FIG. 4. A controller (shown in dashed lines) and signal paths are illustrated diagrammatically.
Figure 7:
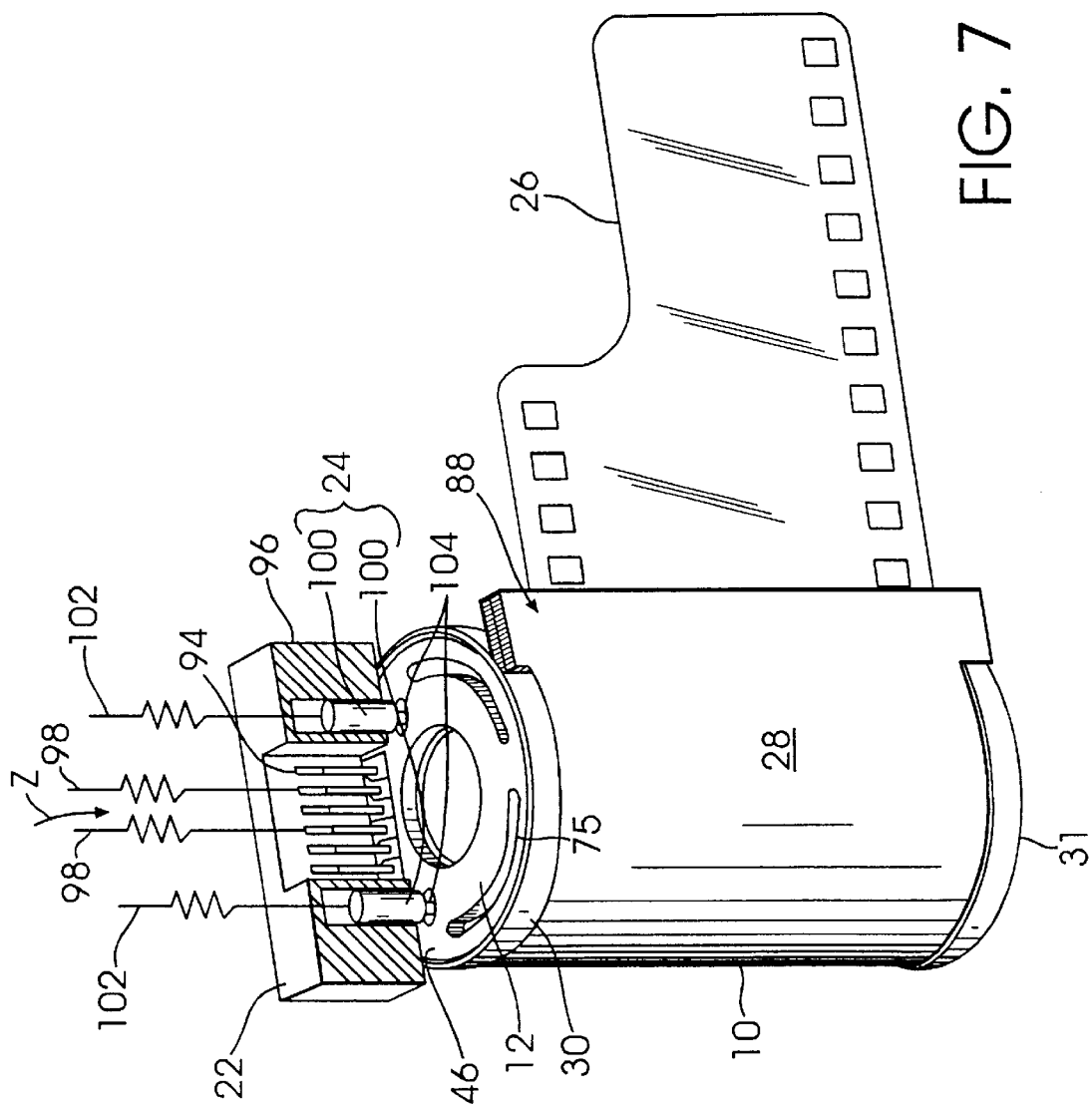
FIG. 7 is a perspective view of the film cassette and terminal block of FIG. 6.

Referring now primarily to FIGS. 6–7, the apparatus 18 has the cassette 10, including the memory module 12, and a photographic device 90. The illustrated photographic device 90 is a camera, but the photographic device 90 is not limited to cameras. For example, the filmstrip 26 in the cassette 10 can be processed film and the photographic device 90 can be a digital scanner or display device. The device 90 has a body 92 that includes the cassette station 20 and terminal block 22. The cassette station 20 is configured to receive the film cassette 10 in a predetermined, fixed orientation. A film transport 93 (illustrated in FIG. 6 by sprocket teeth) is positioned in the body 92 so as to move the filmstrip 26 into or both into and out of the shell 14. The film cassette 10 has a fixed rotational position within the station 20 within narrow tolerances. The film cassette 10 is preferably axially loaded in the station 20.

The terminal block 22 is mounted in the body 92 at an end of the station 20. The terminal block 22 has an array of leads 94, the cam unit 24, and a support structure 96. In the embodiment shown in the figures, the leads 94 are parallel spaced apart pins that are urged by individual springs 98 (illustrated diagrammatically in FIG. 6) in the direction indicated by arrow "Z". The leads 94 are conductive and are spaced to electrically contact individual contacts 54 of the memory module 12.

The cam unit 24 has a pair of opposed cams 100 that are aligned with the leads 94. The cams 100 are individually spring biased in the direction "Z" by springs 102. The cams 100 are preferably non-conductive. The cams 100 each have a conical cam surface 104. In the embodiment shown in the figures, the cam surfaces 104 each have the shape of a regular circular cone.

When loaded, the axis 36 of the film cassette 10 is coextensive with an axis 106 of the station 20. The access site is predetermined and standardized for the cassette 10. Thus, when the cassette 10 is loaded in the station 20, a corresponding access site in the station 20 is also defined. The terminal block 22 is mounted in the body 88 in the cassette station 20 in alignment with the access site. The springs 98,102 bias the leads 94 and cam unit 24 toward engagement with the memory module 12.

In use, the film cassette 10 is loaded into the cassette station 20 and assumes the predetermined cassette orientation. The locator 16 and cam unit 24 are moved relative to each other until the locating surfaces 58 and cam surfaces 104 touch. Further relative movement causes the memory module 12 to pivot within the module slot 11 until the cams 100 are centered as to the respective locating surfaces 58. The acceptable range of motion of the module 12 within the slot 11 is determined by the capability of the cam unit 24 to orient the module during engagement of the locating surfaces 58 and cam unit 24 such that each of the leads 94 is biased against a corresponding contact 54 and none of the leads 94 bridge two contacts 54.

When fully seated by the biasing of the springs 98,102, the terminal block 22 is registered with the memory module 12 and the leads 94 and contacts 54 are held together, in alignment. Further rotation of the memory module 12 is arrested, until the film cassette 10 is removed from the device 18. In the embodiments shown in the figures, the cam surfaces 104 are conical and the locating surfaces 58 are the margins of openings. Other shapes can be provided for these surfaces as long as the combination of cam surfaces 104 and locating surfaces 58 would result in the described reorientation of the memory module 12 in the module slot 11.

Figure 8:
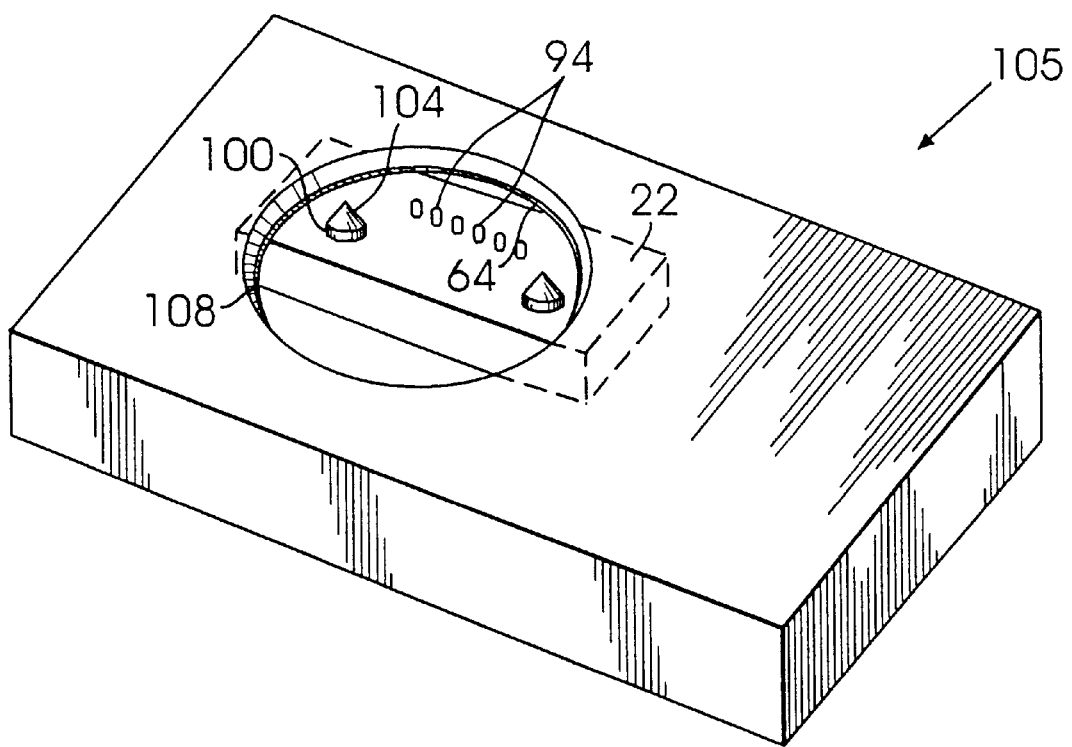
FIG. 8 is a perspective view of the module reader. The position of parts of the terminal block within the body of the reader is indicated by dashed lines.
Figure 9:
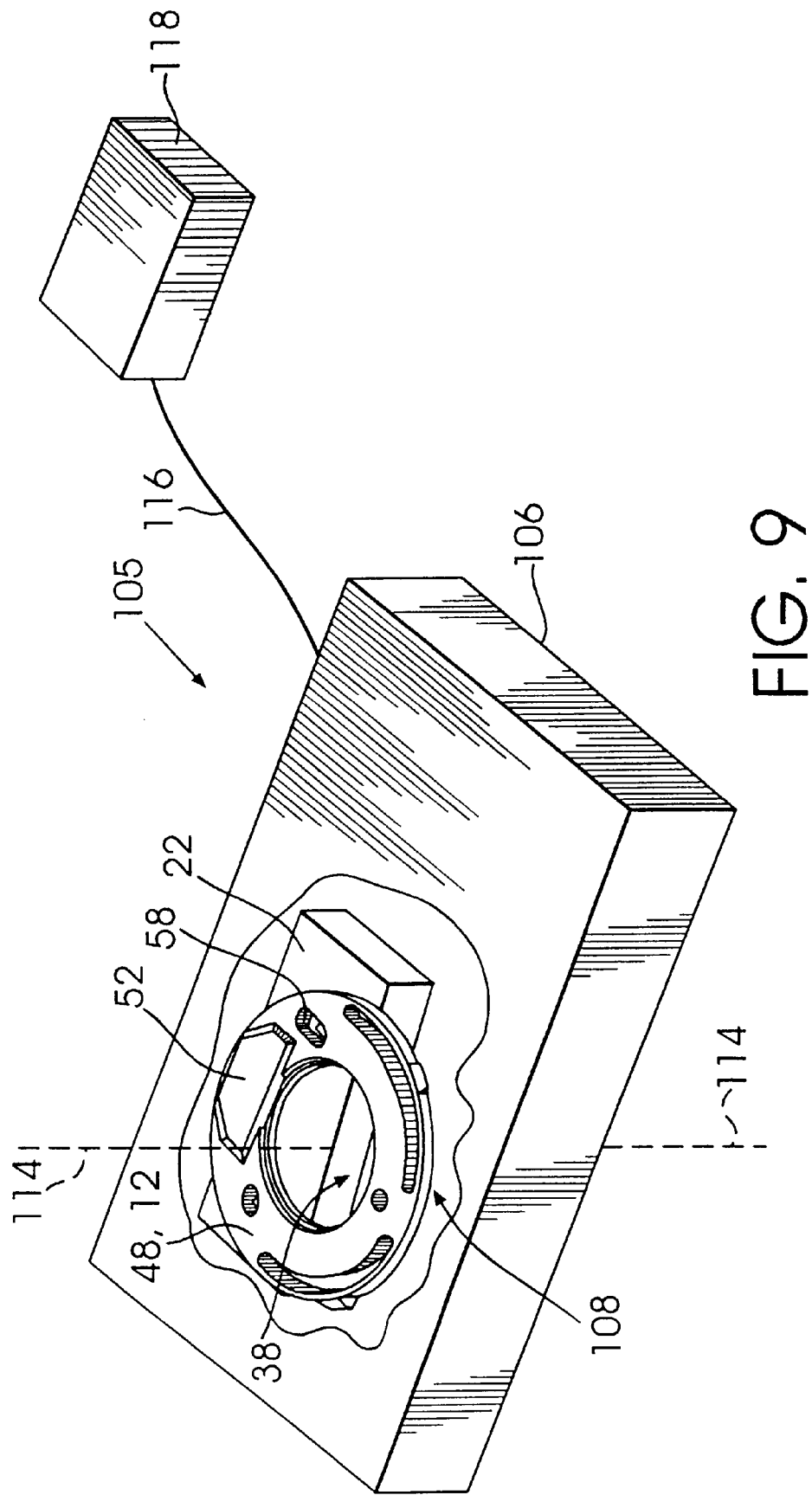
FIG. 9 is a partially cut-away perspective view of the reader of FIG. 8. The memory module of FIG. 1 is loaded in the module socket of the reader.
Figure 10:
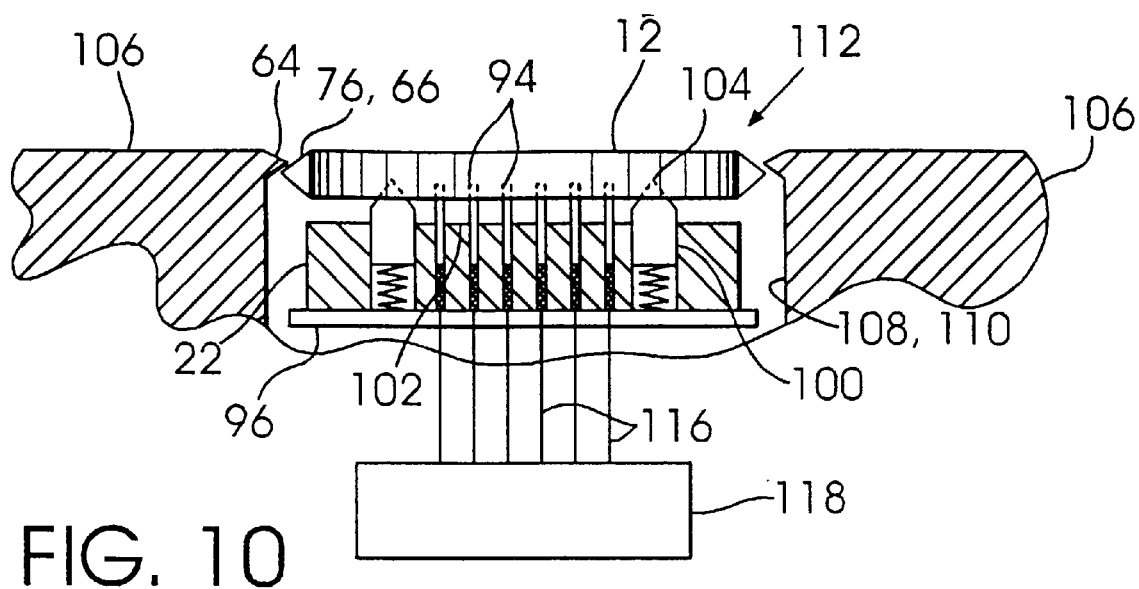
FIG. 10 is a partial cross-sectional view of the reader and module of FIG. 9. The controller of the reader and signal paths are illustrated diagrammatically.
Figure 11:
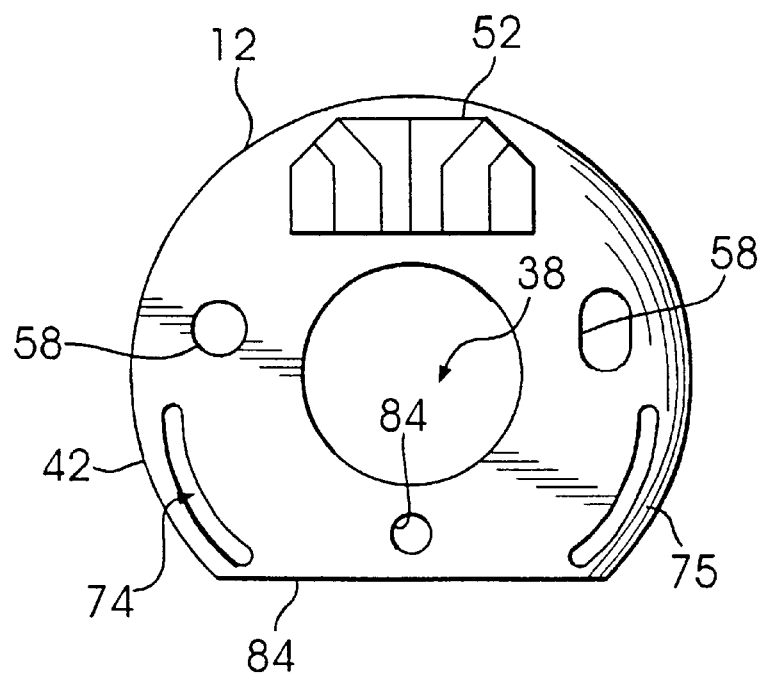
FIG. 11 is a perspective view of another embodiment of the memory module.

Referring now to FIGS. 8–10, a memory module reader 105 allows use of the memory module 12 when detached from a cassette 10. The reader 105 has a body 106 that has a module socket 108 having a circumferential wall 110. The module socket 108 defines a cylindrical socket site 112 and a socket axis 114. A terminal block 22 having the same features as the terminal block 22 previously described, is joined to the body 106. The cam unit 24 of the terminal block 22 is aligned with the socket site 112. The springs 98,102 bias the cam unit 24 and leads 94, respectively, toward the socket site 112. The reader 105 can have a bumper 82 complementary to a memory module bumper 84, as previously described for the cassette shell 14; but such a reader bumper is optional, since rotation of the memory module 12 within the reader 105 after alignment, is deterred by the cam unit 24 of the terminal block 22.

The module socket 108 has a collar 64 that extends radially inward from the circumferential wall 110 in the same manner as the collar 64 previously described. The collar 64 borders and defines an opening for the admission of the memory module 12 into the socket site 112. Below the collar 64, the socket 108 is sized to receive the retainer 66 and permit rotation of the module 12.

When the memory module 12 is loaded into the socket 108 the memory module 12 is flexed, inserted past the collar 64, and then released. The unflexed memory module 12 fits loosely within the circumferential wall 110 of the module socket 108. The leads 94 and cams 100 impinge against the upper surface 46 of the memory module 12 and bias the memory module 12 against the collar 64. (In FIG. 9, the upper surface 46 faces the bottom of the drawing.) The biasing by the springs 98,102 is easily overcome, allowing manual or automatic rotation of the memory module 12 within the socket site 112. Rotation is needed to bring the locator 16 and cam unit 24 into alignment, unless the memory module 12 was initially loaded in an aligned position. Once the memory module 12 and terminal block 22 are aligned within the socket site 112, the cams 100 engage the locating surfaces 58, and the leads 94 engage corresponding contacts 54 of the memory module 12. Further rotation of the memory module 12 is deterred by the engagement of the locator 16 and cam unit 24.

In both the apparatus 18 and reader 105, the leads 94 are operatively connected by signal paths 116 to a controller 118 which allows the memory of the memory module 12 to be accessed for reading or writing or both. Suitable hardware and controllers are well known to those of skill in the art. For example, the leads can be hard wired to a programmable computer or can be connected by wireless interface or can be remotely connected through a network.

The memory module 12 can be used to store a variety of information. For example, the memory module 12 can store photofinishing information or user recorded information about individual exposures. The memory module 12 can be installed on film cassette 10 at the time of manufacture or by a film dealer at the time of purchase or by an end-user. The memory module 12 can be retained on the film cassette 10 when the cassette is submitted for photofinishing. The information in memory can be read out by the photofinisher with the memory module 12 retained on the cassette shell 14 or the memory module 12 can be removed from the shell 14 prior to reading. The memory module 12 can be used once by a purchaser and can then be recycled or disposed of after photofinishing. The memory module 12 can alternatively, be returned to the purchaser with processed film. Since with Type 135 film the cassette is not returned, the memory module 12 is separated from the cassette during photofinishing. The returned memory module 12 can be kept by the user to retain information recorded by the user or relating to photofinishing. The memory module 12 can alternatively, be installed by the user on a new film unit. For reuse, necessary memory must be cleared at photofinishing or later by the user. The reader 105 can be used to add, remove, or modify information recorded in the memory module 12 at any time the memory module 12 is detached from a cartridge. For example, the reader 105 can be used to write information to the memory module 12 prior to assembly of the memory module 12 into a cartridge and can be used by a user to read out information, such as sounds or lighting conditions, recorded at the time of image capture.

The invention has been described in detail with particular reference to certain preferred embodiments thereof, but it will be understood that variations and modifications can be effected within the spirit and scope of the invention.

What is claimed is:

1. A memory module reader for use with a memory module, said reader comprising:
   a body having a module socket, said module socket defining a cylindrical contact site and a site axis;
   a terminal block joined to said body, said terminal block including a plurality of leads and a cam unit having at least one cam surface, said cam unit being aligned with said contact site, said cam unit and leads being biased, in the same direction, toward said contact site.

2. The reader of claim 1 wherein said cam unit includes a pair of spaced apart cams, each said cam having a cam surface.

3. The apparatus of claim 1 wherein said leads are resiliently biased toward said contact site independent of said cams.

4. The reader of claim 1 wherein said module socket has a circumferential wall and a collar extending radially inward from said circumferential wall.

5. The reader of claim 1 further comprising a controller operatively connected to said leads.

6. An assembly comprising:
   a memory module reader including:
      a body having a module socket, said module socket defining a cylindrical contact site and a site axis;
      a terminal block joined to said body, said terminal block including a plurality of leads and a cam unit having at least one cam surface, said cam unit being aligned with said contact site, said cam unit being biased toward said contact site; and
   a memory module removably retained in said module socket, said memory module including:
      a flexible support; and
      a memory element fixed to said support.

7. The assembly of claim 6 wherein said support is discoid.

8. The assembly of claim 6 wherein said memory module has a locator and a plurality of contacts aligned with said locator.

9. The assembly of claim 8 wherein said locator has a pair of opposed subunits, each said subunit having a locating surface.

10. The assembly of claim 9 wherein one of said locating surfaces has an oval shape and the other of said surfaces has a circular shape.

11. The assembly of claim 10 wherein said locating surfaces are margins of holes in respective said subunits.

12. The assembly of claim 6 wherein said cam unit includes a pair of spaced apart cams, each said cam having a cam surface.

13. The assembly of claim 12 wherein said cams are resiliently biased toward said contact site.

14. The assembly of claim 13 wherein said memory module is arrested and rotationally oriented relative to said axis by said cam unit.

15. The assembly of claim 14 wherein said cam unit includes a pair of spaced apart cams, each said cam having a cam surface; and said locator has a pair of opposed subunits, each said subunit having a locating surface.

16. A memory module reader for use with a memory module, said reader comprising:
   a body having a module socket, said module socket defining a cylindrical contact site and a site axis;
   a terminal block joined to said body, said terminal block including a plurality of leads and a cam unit having at least one cam surface, said cam unit being aligned with said contact site, said cam unit being biased toward said contact site, wherein said cam unit includes a pair of spaced apart cams, each said cam having a cam surface.

17. The reader of claim 16 wherein said leads are resiliently biased toward said contact site independent of said cams.

18. The reader of claim 16 wherein said cam surfaces are each conical.

19. A memory module reader for use with a memory module, said reader comprising:
   a body having a module socket, said module socket defining a cylindrical contact site and a site axis;
   a terminal block joined to said body, said terminal block including a plurality of leads and a cam unit having at least one cam surface, said cam unit being aligned with said contact site, said cam unit being biased toward said contact site, wherein said leads are resiliently biased toward said contact site independent of said cams.

20. The reader of claim 19 wherein said cam unit includes a pair of spaced apart cams, each said cam having a conical cam surface.

* * * * *